United States Patent
Minamiura

(10) Patent No.: US 9,858,147 B2
(45) Date of Patent: Jan. 2, 2018

(54) STORAGE APPARATUS AND METHOD OF CONTROLLING STORAGE APPARATUS

(71) Applicant: FUJITSU LIMITED, Kawasaki-shi, Kanagawa (JP)

(72) Inventor: Kiyoto Minamiura, Koto (JP)

(73) Assignee: FUJITSU LIMITED, Kawasaki (JP)

( * ) Notice: Subject to any disclaimer, the term of this patent is extended or adjusted under 35 U.S.C. 154(b) by 141 days.

(21) Appl. No.: 14/608,392

(22) Filed: Jan. 29, 2015

(65) Prior Publication Data

US 2015/0242145 A1    Aug. 27, 2015

(30) Foreign Application Priority Data

Feb. 24, 2014   (JP) .................. 2014-032665

(51) Int. Cl.
*G06F 11/00*   (2006.01)
*G06F 11/10*   (2006.01)
*G06F 11/20*   (2006.01)

(52) U.S. Cl.
CPC ...... *G06F 11/1088* (2013.01); *G06F 11/2094* (2013.01)

(58) Field of Classification Search
CPC .... G06F 3/0619; G06F 3/0644; G06F 3/0689; G06F 11/1088; G06F 11/2056; G06F 11/2094
See application file for complete search history.

(56) References Cited

U.S. PATENT DOCUMENTS

| | | | | |
|---|---|---|---|---|
| 5,666,512 A * | 9/1997 | Nelson | ........... | G06F 11/2094 711/114 |
| 6,275,898 B1 * | 8/2001 | DeKoning | ........... | G06F 3/0605 711/114 |
| 7,315,958 B1 * | 1/2008 | Bridge, Jr. | ........... | G06F 11/1076 714/3 |
| 8,566,520 B1 * | 10/2013 | Bitner | ........... | G06F 3/0605 711/114 |
| 9,043,639 B2 * | 5/2015 | Barrall | ........... | 711/112 |
| 9,335,928 B2 * | 5/2016 | Shah | ........... | G06F 12/0866 |
| 9,411,523 B2 * | 8/2016 | Cudak | ........... | G06F 3/0619 |
| 2004/0059869 A1 * | 3/2004 | Orsley | ........... | G06F 11/1076 711/114 |
| 2005/0102470 A1 | 5/2005 | Ishizaki | | |

(Continued)

FOREIGN PATENT DOCUMENTS

| | | |
|---|---|---|
| JP | 2000-200157 | 7/2000 |
| JP | 2003-108316 | 4/2003 |

(Continued)

OTHER PUBLICATIONS

Japanese Office Action dated Aug. 8, 2017 in corresponding Japanese Patent Application No. 2014-032665, 5 pages.

*Primary Examiner* — Philip Guyton
(74) *Attorney, Agent, or Firm* — Staas & Halsey LLP

(57) ABSTRACT

A storage apparatus includes: a plurality of storage devices individually including a first storage area storing data, and a second storage area storing same data as part of the data stored in the first storage area, and configured to distributedly store a plurality of data belonging to a same management unit; and a control unit configured to set a use ratio for each of the management units on the second storage areas included in the plurality of storage devices based on a priority set for each of the management units.

15 Claims, 14 Drawing Sheets

(56) References Cited

U.S. PATENT DOCUMENTS

| | | |
|---|---|---|
| 2006/0031648 A1 | 2/2006 | Ishikawa et al. |
| 2008/0301388 A1 | 12/2008 | Nakazato et al. |
| 2011/0066803 A1 | 3/2011 | Arakawa et al. |
| 2015/0074454 A1 | 3/2015 | Tanaka et al. |

FOREIGN PATENT DOCUMENTS

| | | |
|---|---|---|
| JP | 2005-166016 | 6/2005 |
| JP | 2006-53601 | 2/2006 |
| JP | 2008-242524 | 10/2008 |
| JP | 2008-299375 | 12/2008 |
| JP | 2009-205571 | 9/2009 |
| JP | 2011-65625 | 3/2011 |
| WO | 2013/190649 | 12/2013 |

* cited by examiner

FIG. 8

| RAID NAME | VOLUME NAME | FREQUENCY (P1) | FACTOR (P2) | CARDINAL NUMBER (P3) | PRIORITY (P4) | GRANULARITY (P5) | RANK (R) |
|---|---|---|---|---|---|---|---|
| RAID_A | V1 | 5000 | 1 | 1000 | 6000 | 5000 | 2 |
| | V2 | 100 | 10 | 1000 | 2000 | | 1 |
| RAID_B | ... | ... | ... | ... | ... | ... | ... |
| RAID_C | ... | ... | ... | ... | ... | ... | ... |
| ... | ... | ... | ... | ... | ... | ... | ... |

FIG. 12

| RAID NAME | VOLUME NAME | USER NAME (U) | GROUP NAME (G) | FREQUENCY (P1) | FACTOR (P2) | CARDINAL NUMBER (P3) | PRIORITY (P4) | GRANULARITY (P5) | RANK (R) |
|---|---|---|---|---|---|---|---|---|---|
| RAID_A | V1 | User1 | Group1 | 3000 | 1 | 1000 | 9500 | 5000 | 2 |
| | | User2 | Group2 | 500 | 2 | 2000 | | | |
| | | User3 | Group1 | 500 | 3 | | | | |
| | V2 | User1 | Group1 | 50 | 10 | 2000 | 5670 | | 2 |
| | | User2 | Group2 | 10 | 5 | | | | |
| | | User3 | Group2 | 40 | 3 | 1000 | | | |
| RAID_B | ... | ... | ... | ... | ... | ... | ... | ... | ... |
| RAID_C | ... | ... | ... | ... | ... | ... | ... | ... | ... |
| ... | ... | ... | ... | ... | ... | ... | ... | ... | ... |

FIG. 13

| RAID NAME | VOLUME NAME | FREQUENCY (P1) | FACTOR (P2) | CARDINAL NUMBER (P3) | NO ACCESS CONTINUOUS TIME (T) | TIME UNIT (t) | DECREASE WIDTH (W) | PRIORITY (P4) | GRANULARITY (P5) | RANK (R) |
|---|---|---|---|---|---|---|---|---|---|---|
| RAID_A | V1 | 0 | 1 | 1000 | 20 | 10 | 500 | 0 | 5000 | 0 |
|  | V2 | 500 | 1 | 1000 | 0 | 10 | 100 | 1500 |  | 1 |
| RAID_B | ⋮ | ⋮ | ⋮ | ⋮ | ⋮ | ⋮ | ⋮ | ⋮ | ⋮ | ⋮ |
| RAID_C | ⋮ | ⋮ | ⋮ | ⋮ | ⋮ | ⋮ | ⋮ | ⋮ | ⋮ | ⋮ |
| ⋯ | ⋯ | ⋯ | ⋯ | ⋯ | ⋯ | ⋯ | ⋯ | ⋯ | ⋯ | ⋯ |

FIG. 14

| DISK NAME | TOTAL NUMBER OF ERRORS (E) | EVALUATION UNIT (e) | INCREASE UNIT [%] | INCREASE RATE (r) | BELONGING VOLUME NAME |
|---|---|---|---|---|---|
| DISK_A | 100 | 50 | 10 | 20% | V1 |
|  |  |  |  |  | V2 |
|  |  |  |  |  | V3 |
| DISK_B | ... | ... | ... | 16% | V1 |
|  |  |  |  |  | V2 |
|  |  |  |  |  | V4 |
| ⋮ | ⋮ | ⋮ | ⋮ | ⋮ | ⋮ |

STORAGE APPARATUS AND METHOD OF CONTROLLING STORAGE APPARATUS

CROSS-REFERENCE TO RELATED APPLICATION

This application is based upon and claims the benefit of priority of the prior Japanese Patent Application No. 2014-032665, filed on Feb. 24, 2014, the entire contents of which are incorporated herein by reference.

FIELD

The embodiments discussed herein are related to a storage apparatus, and a method of controlling a storage apparatus.

BACKGROUND

In systems that handle a large volume of data, redundant arrays of inexpensive disks (RAID) apparatuses capable of achieving high reliability, and high read and write performance are used. A RAID apparatus is an apparatus that is redundantly constructed by connecting a plurality of storage devices (hereinafter referred to as disks), such as hard disk drives (HDD), or the like. In a system as described above, a network attached storage (NAS) apparatus, which is provided with a scheme that allows accesses from a plurality of terminal apparatuses through a network, and which allows central management of data, or the like is also used.

Even if a part of disks fails, a RAID apparatus is provided with a mechanism that allows restoring data that was stored in a failed disk from the data stored in the remaining disks. For example, a RAID apparatus stores parity data, and executes operation processing (hereinafter referred to as parity operation) based on the parity data so as to make it possible to restore the data stored in the failed disk. The restored data is stored in a replacement disk (hereinafter referred to as a spare disk) provided in the RAID apparatus. When data is stored in a spare disk, it is possible for a RAID apparatus to continue normal operation using the spare disk.

As described above, when a RAID apparatus is used, it is possible to continue normal operation even if a failure occurs in a part of the disks. However, if the amount of data to be restored is large, it takes a long time to restore the data by parity operation. That is to say, depending on the amount of data, and the use state, it sometimes takes a long time (hereinafter referred to as data reconstruction time) to perform processing (hereinafter referred to as restoration processing) to restore data that was lost by a disk failure.

In view of the circumstances described above, proposals have been made of a method for reducing data reconstruction time. For example, a proposal is made of a method in which data in an operating disk is stored in a spare disk in advance, and the data stored in the spare disk is used for restoration processing. Also, data stored in the other disks are copied to an unused area of each disk, and the copied data is used for restoration processing. Also, a proposal has been made of a method in which the data copied in a storage area (hereinafter, referred to as a spare area), which is provided in advance for each disk, is used for restoration processing.

Related techniques are disclosed in Japanese Laid-open Patent Publication Nos. 2003-108316, 2009-205571, and 2000-200157.

If a technique according to the above-described proposal (hereinafter, referred to as a proposed technique) is applied, it is possible to use data stored in a spare disk, an unused area, or a spare area (hereinafter referred simply as a spare area) in advance for restoration processing, and thus it is possible to shorten data reconstruction time compared with the case of executing the parity operation. However, the above-described proposed technique is based on the premise that all the data stored in each disk is copied to the spare area.

Providing a disk space capable of storing all the data stored in each disk as a spare area will result in an increase in cost of a RAID apparatus. On the other hand, if the capacity of the spare area is not sufficient, part of data might not be copied. The part of data that has not been copied is restored by parity operation in restoration processing, and thus it takes a long time for restoring the data.

The above-described proposed technique is based on the premise that all the data is copied to the spare area, and no consideration is given to the kind of data to be copied. Accordingly, if the above-described proposed technique is applied, at the time of copy and restoration processing on the data, data to be restored in a short time, and the other data are handled in the same manner. That is to say, in the case where a spare area capable of storing all the data in each disk is not provided, there is a substantially same possibility of taking a long time for restoration regardless of the kind of the data.

SUMMARY

According to an aspect of the invention, a storage apparatus includes: a plurality of storage devices individually including a first storage area storing data, and a second storage area storing same data as part of the data stored in the first storage area, and configured to distributedly store a plurality of data belonging to a same management unit; and a control unit configured to set a use ratio for each of the management units on the second storage areas included in the plurality of storage devices based on a priority set for each of the management units.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a second diagram for explaining the management of the spare areas according to the second embodiment;

FIG. 12 is a diagram illustrating an example of a management table according to a variation (variation#1) of the second embodiment;

FIG. 13 is a diagram illustrating an example of a management table according to a variation (variation#2) of the second embodiment; and FIG. 14 is a diagram illustrating an example of disk management information according to the variation (variation#2) of the second embodiment.

DESCRIPTION OF EMBODIMENTS

In the following, a description will be given of embodiments of the present disclosure with reference to the attached drawings. In this regard, in the embodiments and the drawings, the same symbol is given to a component having substantially the same functions, and a duplicated description is sometimes omitted.

1. First Embodiment

Figure 1:
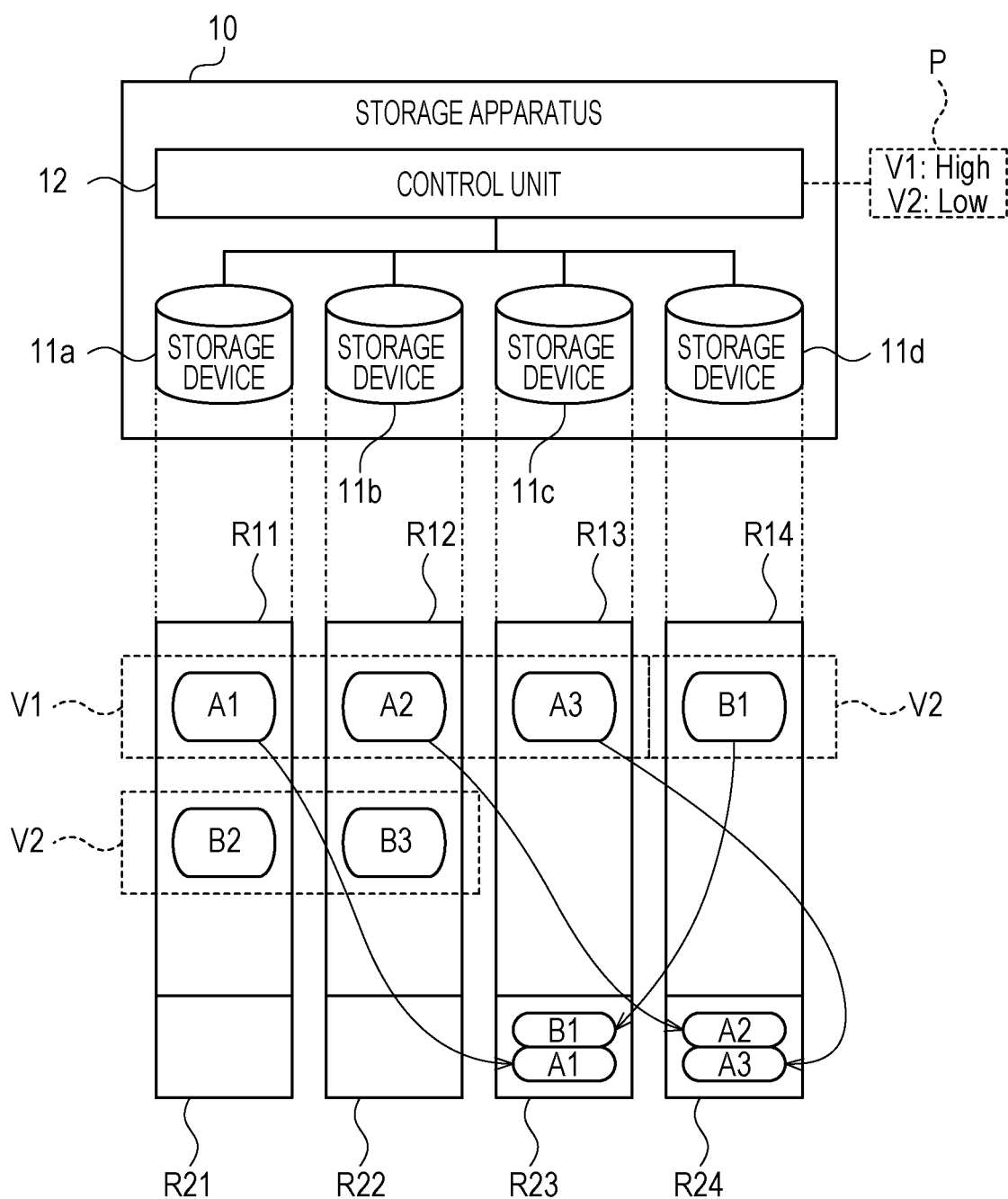
FIG. 1 is a diagram illustrating an example of a storage apparatus according to a first embodiment.

A description will be given of a first embodiment with reference to FIG. 1. In this regard, FIG. 1 is a diagram illustrating an example of a storage apparatus according to the first embodiment. A storage apparatus 10 illustrated in FIG. 1 is an example of the storage apparatus according to the first embodiment.

As illustrated in FIG. 1, the storage apparatus 10 includes a plurality of storage devices 11a, 11b, 11c, 11d, and a control unit 12.

In this regard, a magnetic storage device, such as an HDD, or the like is used for storage devices 11a, 11b, 11c, and 11d. Also, it is possible to use a semiconductor storage device, such as a solid state drive (SSD), a random access memory (RAM) disk, or the like, for the storage devices 11a, 11b, 11c, and 11d. The storage devices 11a, 11b, 11c, and 11d are storage devices having redundancy, for example, a RAID apparatus, or the like. Also, it is possible to use the storage apparatus 10 as a NAS apparatus, or the like, for example.

The control unit 12 is a processor, such as a central processing unit (CPU), a digital signal processor (DSP), or the like. However, the control unit 12 may be an electronic circuit, such as an application specific integrated circuit (ASIC), a field programmable gate array (FPGA), or the like. The control unit 12 is capable of executing a program stored, for example, in a memory built in the storage apparatus 10, or an external memory, or a portable recording medium, which is connected in the storage apparatus 10.

In the example in FIG. 1, the storage devices 11a, 11b, 11c, and 11d include first storage areas R11, R12, R13, and R14, and second storage areas R21, R22, R23, and R24, respectively. The first storage areas R11, R12, R13, and R14 store data A1, A2, A3, B1, B2, and B3. Also, the second storage areas R21, R22, R23, and R24 store the same data as part of data A1, A2, A3, and B1, which are stored in the first storage area R11, R12, R13, and R14, respectively.

Management units V1, and V2 of data are set in the storage devices 11a, 11b, 11c, and 11d. The storage devices 11a, 11b, 11c, and 11d store a plurality of data that belong to the same management unit distributedly. In the example in FIG. 1, data A1, A2, and A3, which belong to the management unit V1, are distributedly stored in the storage devices 11a, 11b, and 11c. Also, data B1, B2, and B3, which belong to the management unit V2, are distributedly stored in the storage devices 11a, 11b, and 11d.

The control unit 12 sets a use ratio on the second storage areas R21, R22, R23, and R24 included in the plurality of storage devices 11a, 11b, 11c, and 11d for each of the management units V1 and V2 based on a priority P set for each of the management units V1 and V2. In the example in FIG. 1, a priority "High" is set to the management unit V1, and a priority "Low" is set to the management unit V2. That is to say, the priority P of the management unit V1 is higher than the priority P of the management unit V2. In this regard, the priority P may be expressed using a plurality of levels set in advance, for example, or may be expressed using a numeric value.

The control unit 12 sets a higher use ratio as the priority P is higher, for example. In the example in FIG. 1, the use ratio of the management unit V1 having a high priority P is set to 3, and a use ratio of the management unit V2 having a low priority P is set to 1. Assuming that the second storage areas to be used are R23 and R24, for example, it becomes possible to store the three pieces of data A1, A2, and A3, which belong to the management unit V1, into the second storage areas, and to store one piece of data B1 belonging to the management unit V2 into the second storage area.

In this regard, for the sake of convenience of explanation, in the example in FIG. 1, it is assumed that the data sizes of the data A1, A2, A3, B1, B2, and B3 are the same, and the capacity of the second storage areas R21, R22, R23, and R24 is twice the size of the data. Of course, the scope of applications of the technique according to the first embodiment is not limited to this, and it is possible to apply the technique to any data sizes, and any capacities.

As described above, the use ratio of the second storage area is set based on the priority set for each management unit of the data so that it becomes possible to store more data having a high priority in the second storage areas than data having a low priority.

Also, the second storage area stores the same data as part of the data stored in the first storage area, and thus if it is possible to use the data stored in the second storage area, restoration processing of the data stored in the first storage area becomes fast. Also, when the technique according to the first embodiment is applied, more data having a high priority is stored in the second storage areas, and thus it is possible to expect further speeding up the restoration processing of the data having a high priority.

In the above, a description has been given of the first embodiment.

2. Second Embodiment

Next, a description will be given of a second embodiment.
2-1. System

Figure 2:
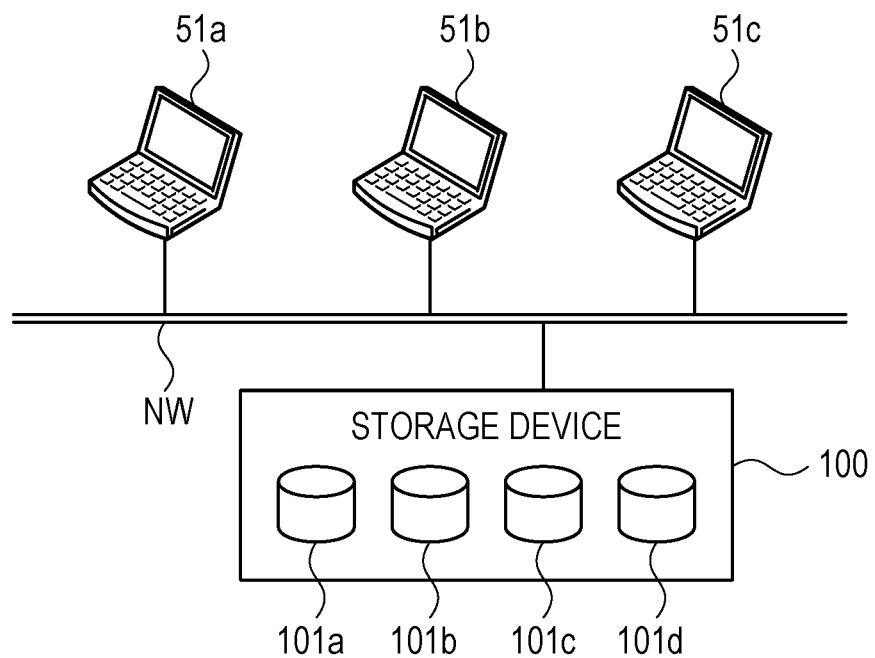
FIG. 2 is a diagram illustrating an example of a system according to a second embodiment.

A description will be given of a system according to the second embodiment with reference to FIG. 2. FIG. 2 is a diagram illustrating an example of the system according to the second embodiment.

As illustrated in FIG. 2, the above-described system includes terminal apparatuses 51a, 51b, and 51c, and a storage apparatus 100.

The terminal apparatuses 51a, 51b, and 51c, and the storage apparatus 100 are connected through a network NW. The network NW is a communication network that connects a plurality of apparatuses using a wired or a wireless communication line, for example. Alternatively, the network NW is a communication network that connects a plurality of apparatuses using a combination of a wired and a wireless communication line. A wired local area network (LAN), a wireless LAN, a mobile communication network, an optical communication network, or the like is an example of the network NW.

The terminal apparatuses 51a, 51b, and 51c are examples of apparatuses using data stored in the storage apparatus 100. For the terminal apparatuses 51a, 51b, and 51c, for example, an information processing apparatus, such as a personal computer, a tablet terminal, and the like, or a communication device, such as a mobile phone, a smart phone, and the like are provided. In this regard, three terminal apparatuses 51a, 51b, and 51c are illustrated in FIG. 2 as an example. However, the number of apparatuses using data in the storage apparatus 100 may be two or less, or four or more.

The storage apparatus 100 includes a plurality of disks 101a, 101b, 101c, and 101d. The disks 101a, 101b, 101c, and 101d are magnetic storage devices, such as an HDD, or the like. However, it is possible to use a semiconductor storage device, such as an SSD, a RAM disk, or the like as the disks 101a, 101b, 101c, and 101d, for example. Also, the disks 101a, 101b, 101c, and 101d function as a RAID apparatus. Also, the storage apparatus 100 functions as a NAS apparatus.

The disks 101a, 101b, 101c, and 101d are provided with a mechanism that allows restoring the data stored in a failed disk even if a part of the disks fails from the data stored in the remaining disks. For example, parity data is stored in the disks 101a, 101b, 101c, and 101d, and it is possible to restore the data stored in a failed disk by executing parity operation. The restored data is stored in a spare disk. When the data is stored in the spare disk, processing in the storage apparatus 100 is continued using the spare disk.

A RAID volume (hereinafter, simply referred to as a volume) is set in the areas (hereinafter referred to as data areas) of the disks 101a, 101b, 101c, and 101d that store data (hereinafter including parity data). One volume is handled as a one continuous storage area from the terminal apparatuses 51a, 51b, and 51c. For example, the volume is formatted by the operating systems of the terminal apparatuses 51a, 51b, and 51c, and becomes a target of data write processing and data read processing in the same manner as a physical disk.

The terminal apparatuses 51a, 51b, and 51c access the storage apparatus 100 through the network NW. Then, the terminal apparatuses 51a, 51b, and 51c execute data write processing, or data read processing on the volume set in the disks 101a, 101b, 101c, and 101d.

In the above, a description has been given of the system according to the second embodiment.

2-2. Storage Apparatus

Figure 3:
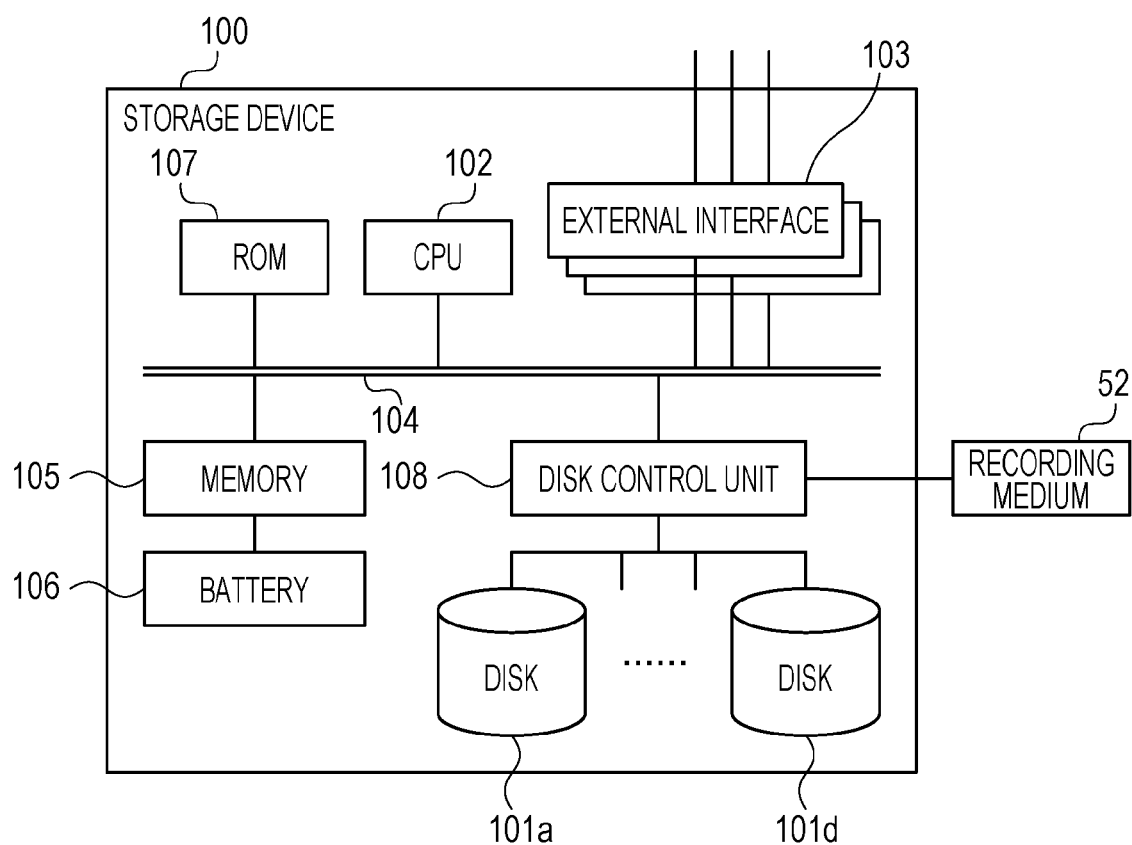
FIG. 3 is a diagram illustrating an example of a storage apparatus according to the second embodiment.

Next, a description will be given of the storage apparatus 100 with reference to FIG. 3. FIG. 3 is a diagram illustrating an example of the storage apparatus according to the second embodiment. In this regard, the storage apparatus 100 exemplified in FIG. 3 is an example of the storage apparatus according to the second embodiment. Also, in the description, FIG. 4 to FIG. 8 are suitably referenced.

As illustrated in FIG. 3, the storage apparatus 100 includes disks 101a, 101b, 101c, and 101d, a CPU 102, an external interface 103, and a bus 104. Further, the storage apparatus 100 includes a memory 105, a battery 106, a read only memory (ROM) 107, and a disk control unit 108.

The disks 101a, 101b, 101c, and 101d are magnetic storage devices. The CPU 102 is an example of a device that controls operation of the storage apparatus 100. The external interface 103 is an example of a communication interface connecting to the network NW, and a device controlling the communication interface. The bus 104 is an internal bus that connects the CPU 102, the external interface 103, the memory 105, the ROM 107, and the disk control unit 108.

The memory 105 temporarily stores the data that has been input through the external interface 103, for example. Also, the memory 105 stores a management table in which the disk control unit 108 manages information on the disks 101a, 101b, 101c, and 101d. For example, the management table includes information, such as an access frequency for each volume set in the disks 101a, 101b, 101c, and 101d. In this regard, a description will be given later of the management table. The battery 106 is a power source that supplies power to the memory 105.

The ROM 107 is a memory that stores a program defining operation of the CPU 102. The disk control unit 108 is a controller that controls the disks 101a, 101b, 101c, and 101d. Also, the disk control unit 108 exchanges data among the CPU 102, the external interface 103, and the memory 105 through the bus 104.

In this regard, the disk control unit 108 may have a mechanism that reads a program stored in a recording medium 52 connected to the storage apparatus 100, and operates in accordance with the read program. The recording medium 52 is a portable recording medium capable of being read by the storage apparatus 100, such as an optical disc, a magnetic disk, a semiconductor memory, or the like, for example.

In the following, a description will be given of setting, use, and management of a spare area set in the disks 101a, 101b, 101c, and 101d. In this regard, the spare area is a storage area which stores the restored data of the data that became unavailable by the failure when a failure occurs in part of disks 101a, 101b, 101c, and 101d.

About Setting Spare Areas

Figure 4:
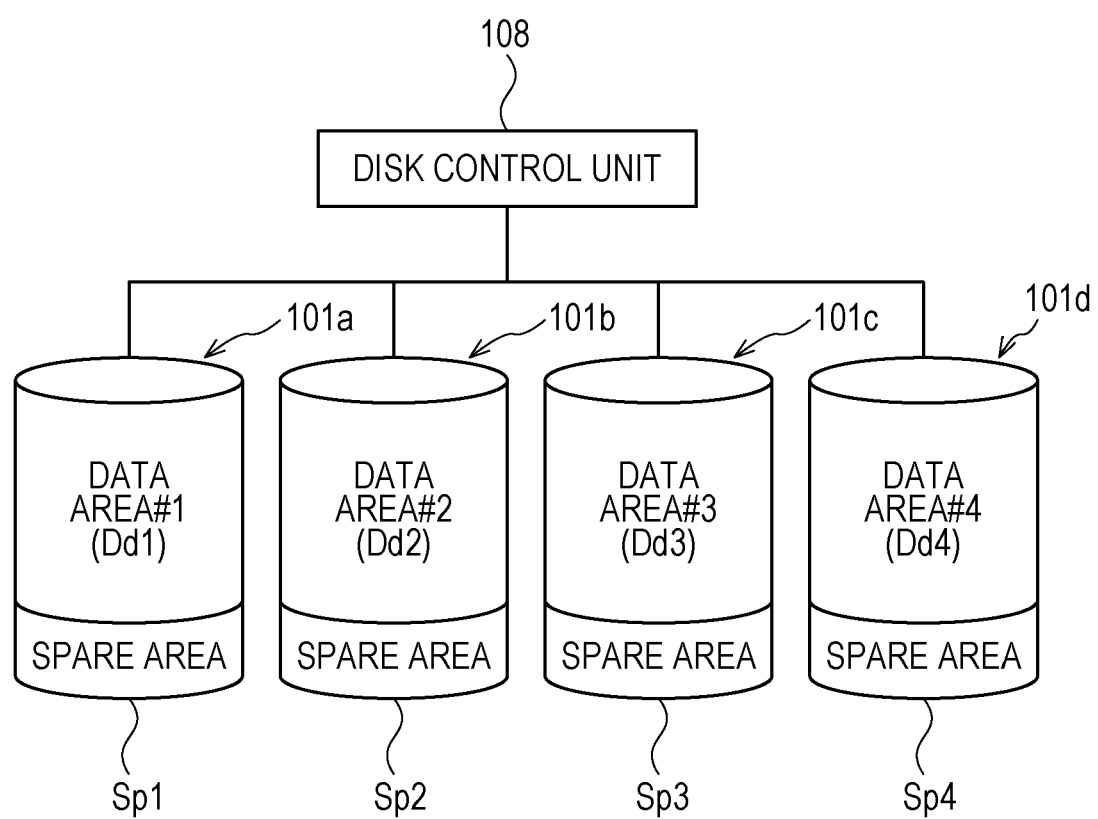
FIG. 4 is a diagram for explaining the setting of spare areas according to the second embodiment.

First, a description will be given of spare areas set in the disks 101a, 101b, 101c, and 101d with reference to FIG. 4. FIG. 4 is a diagram for explaining the setting of the spare areas according to the second embodiment.

As illustrated in FIG. 4, data areas Dd1, Dd2, Dd3, and Dd4, and spare areas Sp1, Sp2, Sp3, are Sp4 are set in the disks 101a, 101b, 101c, and 101d. The data areas Dd1, Dd2, Dd3, and Dd4 are storage areas in which data read and written by the terminal apparatuses 51a, 51b, and 51c are stored.

The spare areas Sp1, Sp2, Sp3, and Sp4 are storage areas in which a part (copy) of the data stored in the data areas Dd1, Dd2, Dd3, and Dd4 are stored. In this regard, the total capacity of the spare areas Sp1, Sp2, Sp3, and Sp4 is set to the same capacity of one disk or more, for example. The spare areas are distributedly disposed in a plurality of disks so that a load imposed on each disk at the time of writing data to the spare areas is distributed.

About Use of Spare Area

Figure 5:
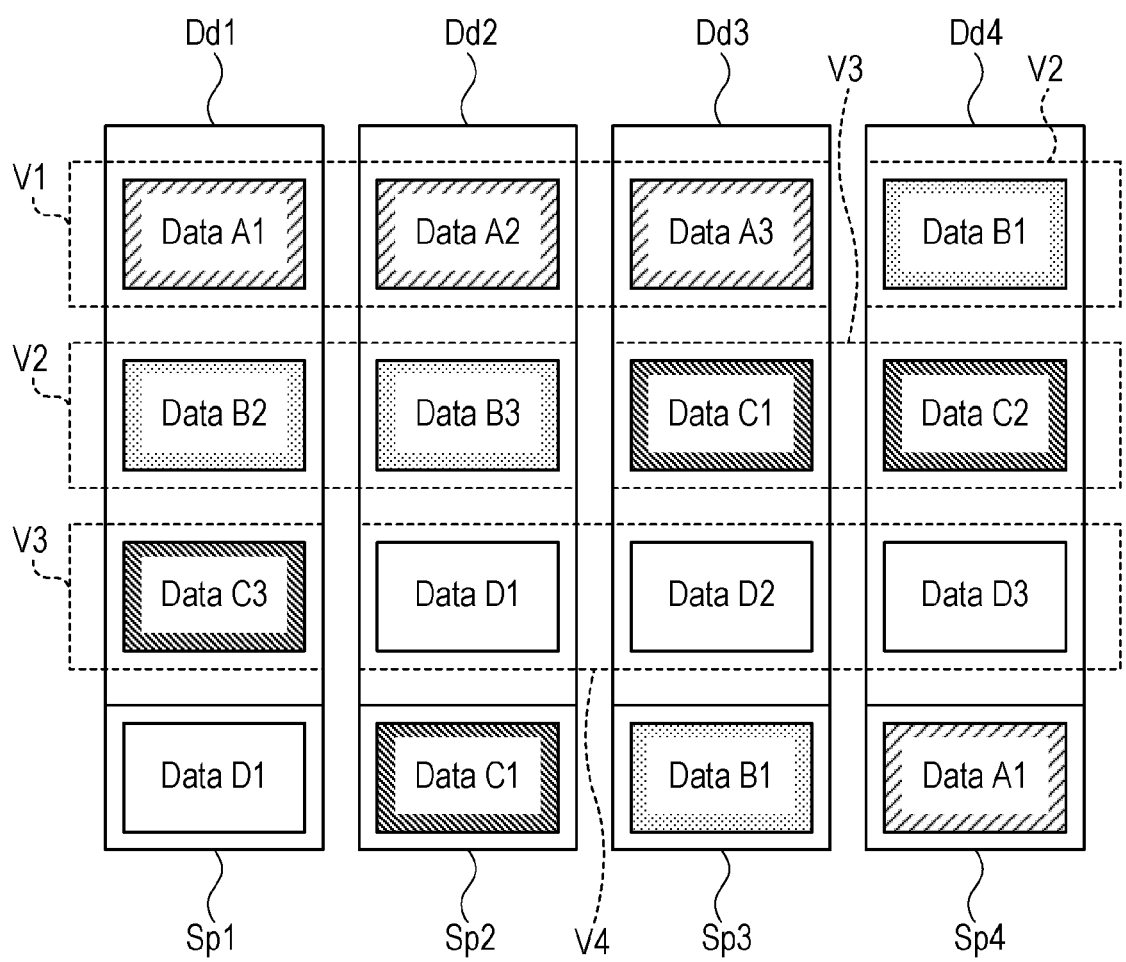
FIG. 5 is a first diagram for explaining the use of the spare areas according to the second embodiment.
Figure 6:
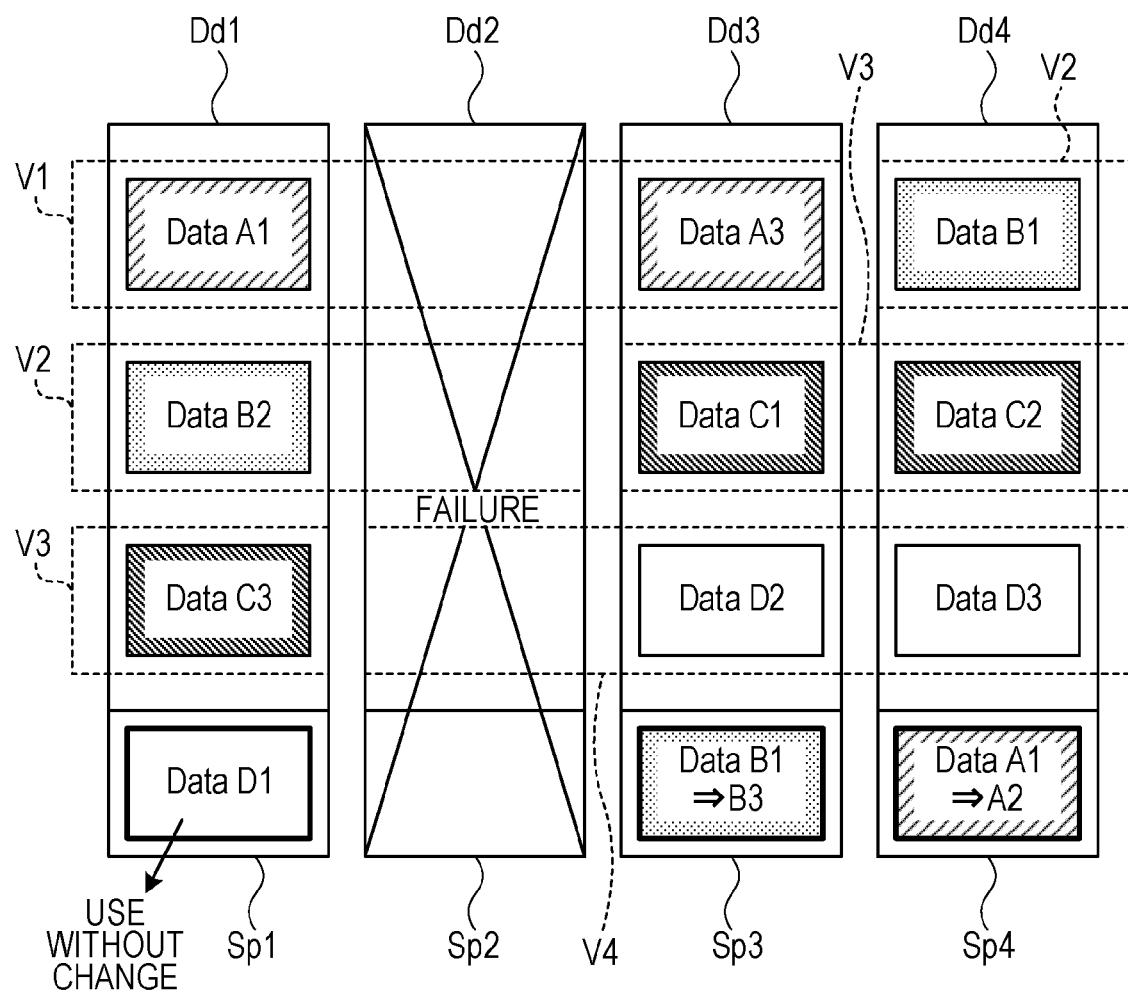
FIG. 6 is a second diagram for explaining the use of the spare areas according to the second embodiment.

Next, a description will be given of use of the spare areas with reference to FIG. 5 and FIG. 6. FIG. 5 is a first diagram for explaining the use of the spare areas according to the second embodiment. Also, FIG. 6 is a second diagram for explaining the use of the spare areas according to the second embodiment.

In the example in FIG. 5, four volumes V1, V2, V3, and V4 are set in the data areas Dd1, Dd2, Dd3, and Dd4. Also, the volume V1 includes data A1, A2, and A3. The volume V2 includes data B1, B2, and B3. The volume V3 includes data C1, C2, and C3. The volume V4 includes data D1, D2, and D3.

If a failure occurs in part of the disks 101a, 101b, 101c, and 101d, a copy of the data to be used for restoration processing is stored in the spare areas. Accordingly, the spare area Sp1 stores data (the data D1 in the example in FIG. 5) selected from the data areas Dd2, Dd3, and Dd4, which is different from the data area Dd1 that is set in the same disk 101a as that of the spare area Sp1. In the same manner, in the example in FIG. 5, the spare area Sp2 stores the data C1, the spare area Sp3 stores the data B1, and the spare area Sp4 stores the data A1.

For example, when the disk control unit 108 receives a write request of the data A1 into the volume V1, the disk control unit 108 writes the data A1 into the data area Dd1, and then writes the data A1 into the spare area Sp4. In a normal state in which a failure has not occurred in any one of the disks 101a, 101b, 101c, and 101d, and normal operation is possible, data is written into the data areas Dd1, Dd2, Dd3, and Dd4, and the spare areas Sp1, Sp2, Sp3, and Sp4 by the method described above.

If a failure occurs in any one of the disks 101a, 101b, 101c, and 101d, restoration processing is executed using data in the spare areas Sp1, Sp2, Sp3, and Sp4. For example, as illustrated in FIG. 6, if the disk 101b fails, the data A2, B3, and D1, which were stored in the data area Dd2, become an unavailable state.

The disks 101a, 101b, 101c, and 101d have redundancy as a RAID apparatus. Accordingly, it is possible for the disk control unit 108 to restore data A2, B3, and D1 using the data (parity data) stored in the data areas Dd1, Dd3, and Dd4. However, the spare area Sp1 stores the data D1. Accordingly, the disk control unit 108 uses the data D1 stored in the spare area Sp1 without change.

In this case, as illustrated in FIG. 6, the disk control unit 108 restores data A2, and B3 using the parity data, stores the restored data A2 into the spare area Sp4, and stores the restored data B3 into the spare area Sp3. As a result, it is possible to continue operation of the storage apparatus 100 using the data D1 stored in the spare area Sp1, the data B3 stored in the spare area Sp3, and the data A2 stored in the spare area Sp4.

As described above, the data (the data D1 in the example in FIG. 6) stored in the spare area in advance is used without change so that it is possible to reduce the number of times of the parity operations. In the example in FIG. 6, the number of times of parity operation is reduced to ⅔. Also, the number of times of writing data, which is executed at the time of restoration, into the spare areas (in the example in FIG. 6, two times of writing into the spare areas Sp3, and Sp4), is also reduced to ⅔. As a result, the amount of time from the occurrence of a failure to the start of normal operation of the storage apparatus 100 is shortened.

About Management of Spare Areas

Figure 7:
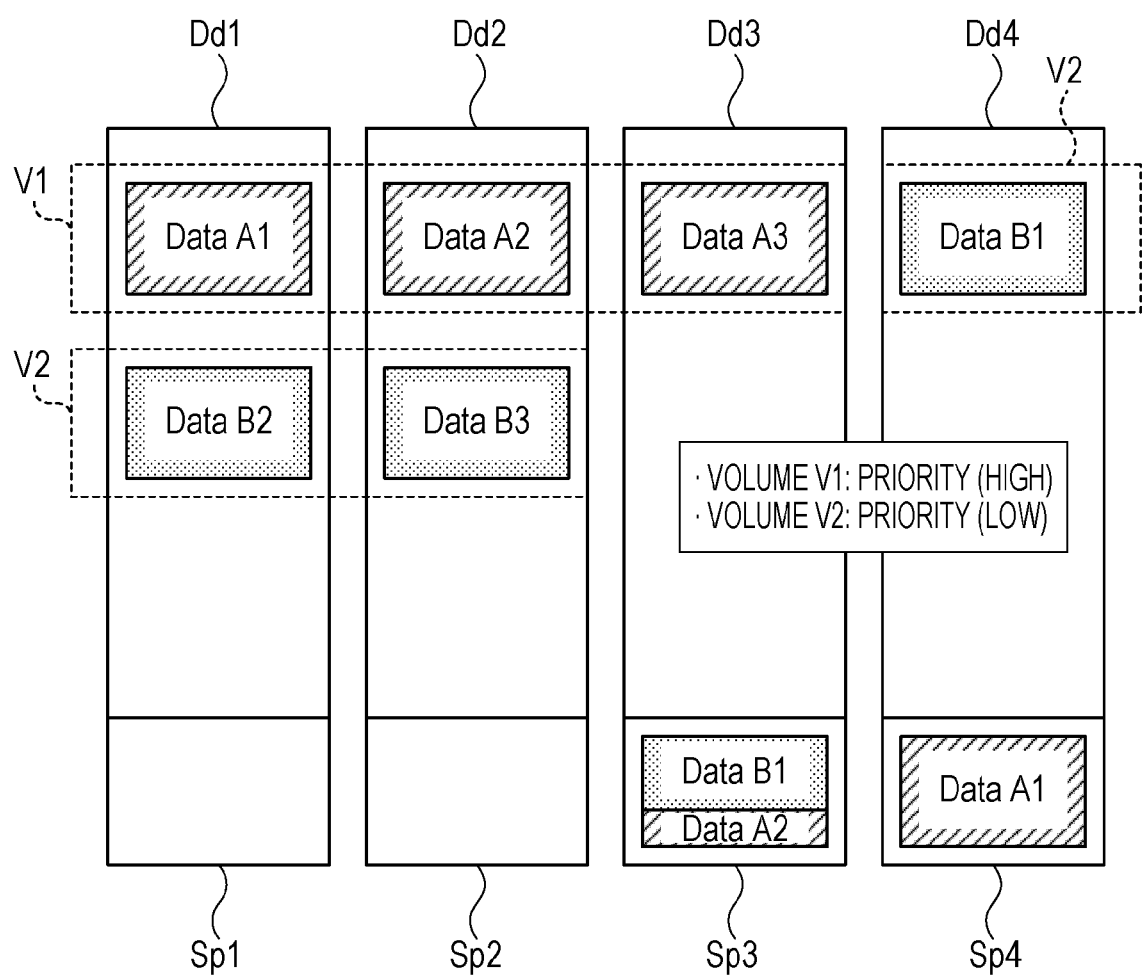
FIG. 7 is a first diagram for explaining the management of the spare areas according to the second embodiment.

Here, a description will be given of management of spare areas with reference to FIG. 7 and FIG. 8. FIG. 7 is a first diagram for explaining the management of the spare areas according to the second embodiment. Also, FIG. 8 is a second diagram for explaining the management of the spare areas according to the second embodiment.

In the example in FIG. 5, the data included in the volumes V1, V2, V3, and V4 individually have the same ratio as the that of the data stored in the spare areas Sp1, Sp2, Sp3, and Sp4. Here, as illustrated in FIG. 7, a description will be given of a mechanism of changing the ratio of data stored in the spare area in accordance with the priority set for each volume.

In the example in FIG. 7, the priority of the volume V1 is set high, and the priority of the volume V2 is set low. In this case, the ratio of the data (A1 and part of A2) included in the volume V1 to be stored into the spare areas (Sp3 and Sp4) is set higher than the ratio of the data (part of B1) included in the volume V2 to be stored into the spare area (Sp3). The determination processing of the ratio is executed by the function of the disk control unit 108 based on the management table exemplified in FIG. 8.

The disk control unit 108 measures the number of accesses in unit time (a frequency P1) for each volume, and records the measured frequency P1 in the management table. In this regard, if there are a plurality of RAID apparatuses that are managed by the disk control unit 108, the frequency P1 for each volume is recorded in the management table in association with a RAID name for identifying a RAID apparatus as illustrated in FIG. 8. For example, if data writing and reading is performed on the volume V1 of RAID_A for 5000 times in total per unit time, 5000 is recorded in the field indicating the frequency P1 in the management table.

Also, a factor P2, which is a weight value on the frequency P1 when calculating a priority P4 is set in the management table for each volume. Further, a cardinal number P3, which is a weight value to be added to the frequency P1 weighted by the factor P2 when calculating the priority P4 is set in the management table for each volume. Then, a granularity P5, which indicates a threshold value for calculating the use ratio of a spare area allocated for each volume from the priority P4, is set in the management table for each RAID apparatus.

At the time of determining the use ratio of a spare area, the disk control unit 108 refers to the management table, multiplies the frequency P1 by the factor P2, adds the cardinal number P3 to the product of the frequency P1 and the factor P2 in order to calculate the priority P4. To put it another way, the priority P4 is given by $P4=P1 \times P2+P3$.

In the example in FIG. 8, the frequency P1 measured for the volume V1 is 5000, the factor P2 is 1, and the cardinal number P3 is 1000, and thus the priority P4 of the volume V1 becomes 6000 ($=5000 \times 1+1000$). Also, the frequency P1 measured for the volume V2 is 100, the factor P2 is 10, and the cardinal number P3 is 1000, and thus the priority P4 becomes 2000 ($=100 \times 10+1000$).

The disk control unit 108 compares the priority P4 (6000) of the volume V1 with n×granularity P5 (5000) (n=0, 1, 2, . . . ). In this case, the priority P4 of the volume V1 is higher than 1×granularity P5, and lower than 2×granularity P5. Accordingly, the disk control unit 108 sets the rank R, which indicates an index value used for determining the use ratio, to 2.

The disk control unit 108 compares the priority P4 (2000) of the volume V2 with n×granularity P5 (5000) (n=0, 1, 2, . . . ). In this case, the priority P4 of the volume V2 is higher than 0×granularity P5, and lower than 1×granularity P5. Accordingly, the disk control unit 108 sets the rank R, which indicates an index value used for determining the use ratio, to 1.

As described above, if the priority P4 is higher than n×granularity P5, and lower than (n+1)×granularity P5, the disk control unit 108 sets the rank R to (n+1). The disk control unit 108 determines the ratio of a spare area using the rank R obtained for each volume. In the example in FIG. 8, the ratio of the capacity of the spare area allocated to the data of the volume V1 to the capacity of the spare area allocated to the data of the volume V2 is set to 2:1 (the ratio of the rank R).

In this regard, if the rank R of the volume V1 is 2, the rank R of the volume V2 is 1, and the rank R of the volume V3 is 1, the distribution ratio of capacity is set to 2:1:1.

As illustrated in FIG. 7, the disk control unit 108 allocates the capacity of the spare area for each volume in accordance with the ratio set for each volume. In this regard, when the disk control unit 108 allocates a volume to a spare area, the disk control unit 108 stores information indicating allocation setting in the memory 105. Also, when the disk control unit 108 writes data in a volume, the disk control unit 108 stores the same data as the data allocated to the volume into the spare area. In the example in FIG. 7, a larger amount of the data included in the volume V1 is stored in the spare area than the amount of the data included in the volume V2.

In the above, a description has been given of the storage apparatus 100. As described above, the allocation ratio of the spare area is changed in accordance with the priority set (calculated) for each volume so that the possibility of allowing quick restoration of data having a high priority at the time of failure occurrence is increased.

2-3. Processing Flowchart

Next, a description will be given of the processing flow executed by the storage apparatus 100.

About Processing on Setting Before Operation Start

A description will be given of a processing flow before operation start among processing executed by the storage apparatus 100 with reference to FIG. 9.

Figure 9:
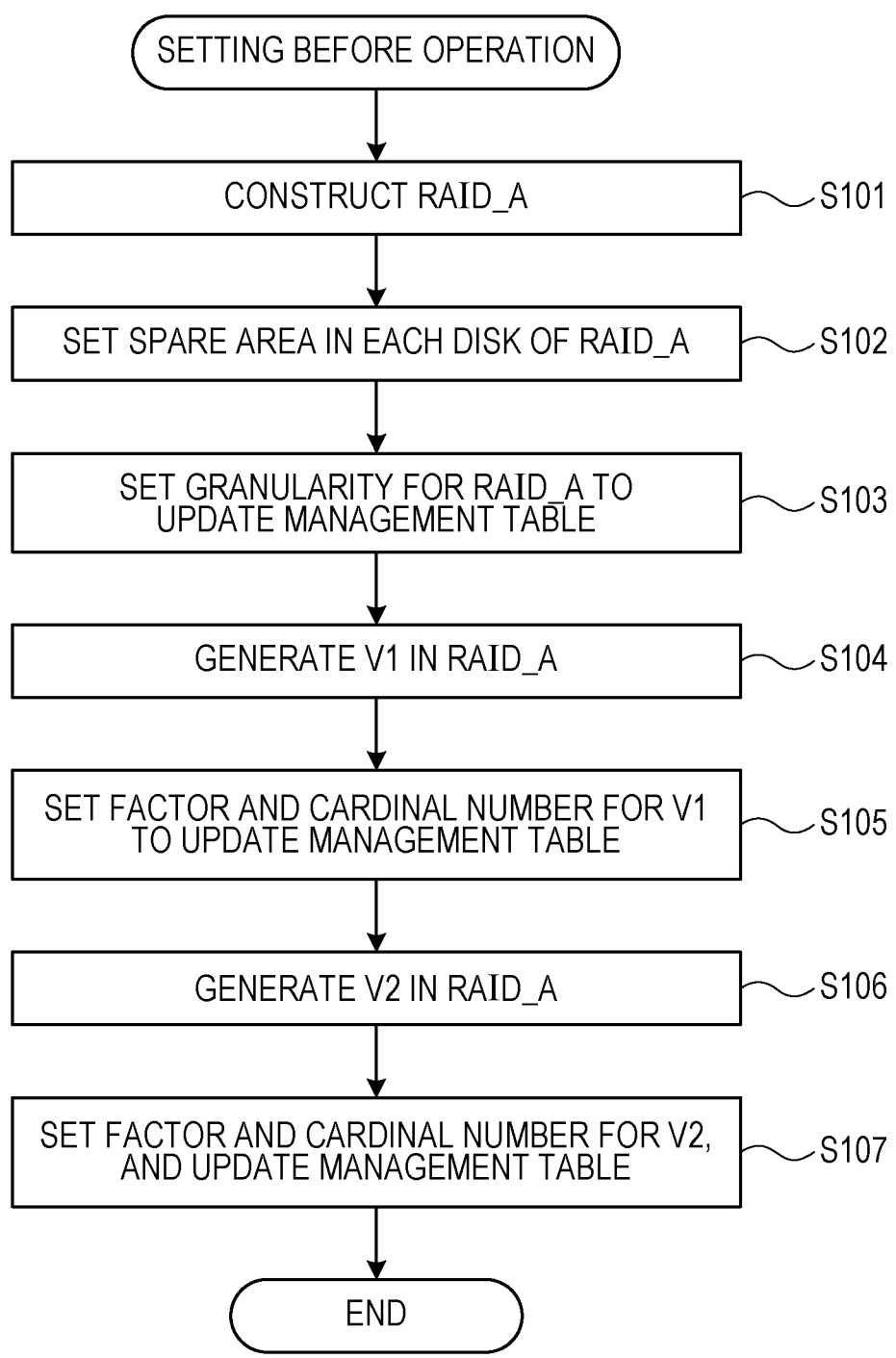
FIG. 9 is a flowchart illustrating a flow of the processing on the setting before operation start among the processing executed by the storage apparatus according to the second embodiment.

In this regard, FIG. 9 is a flowchart illustrating a flow of the processing on the setting before operation start among the processing executed by a storage apparatus according to the second embodiment. Also, the processing illustrated in FIG. 9 is mainly executed by the disk control unit 108. Also, a description will be given of the case where the volumes V1 and V2 are set in the RAID apparatus of RAID_A for the sake of simplicity, the same processing is applied to the case where the number of RAID apparatuses, or the number of volumes, or the like is different.

As illustrated in FIG. 9, the disk control unit 108 constructs a RAID apparatus using the disks 101a, 101b, 101c, and 101d, and sets a RAID name identifying the RAID apparatus in RAID_A (S101). Next, the disk control unit 108 sets spare areas (spare areas Sp1, Sp2, Sp3, and Sp4) in each of the disks (disks 101a, 101b, 101c, and 101d) of RAID_A (S102).

Next, the disk control unit 108 sets the granularity P5 to RAID_A (S103). Also, in the processing in S103, the disk control unit 108 records the set granularity P5 in the management table to update the management table. For example, the granularity P5 is specified by a user or an administrator of the storage apparatus 100, and is set by the disk control unit 108. Next, the disk control unit 108 generates a volume V1 on RAID_A (S104).

Next, the disk control unit 108 sets a factor P2 and a cardinal number P3 to the volume V1 (S105). Also, in the processing in S105, the disk control unit 108 records the set factor P2 and cardinal number P3 in the management table to update the management table. For example, the factor P2 and the cardinal number P3 are specified by the user or the administrator of the storage apparatus, and set by the disk control unit 108. Next, the disk control unit 108 generates a volume V2 in RAID_A (S106).

Next, the disk control unit 108 sets a factor P2 and a cardinal number P3 to the volume V2 (S107). Also, in the processing in S107, the disk control unit 108 records the set factor P2 and cardinal number P3 in the management table to update the management table. For example, the factor P2 and the cardinal number P3 are specified by the user or the administrator of the storage apparatus 100, and are set by the disk control unit 108. When the processing in S107 is completed, a series of the processing illustrated in FIG. 9 is terminated.

In the above, a description has been given of the processing flow on the setting before operation start.

About Processing After Operation Start

Next, a description will be given of the processing flow after operation start among the processing executed by the storage apparatus 100 with reference to FIG. 10.

Figure 10:
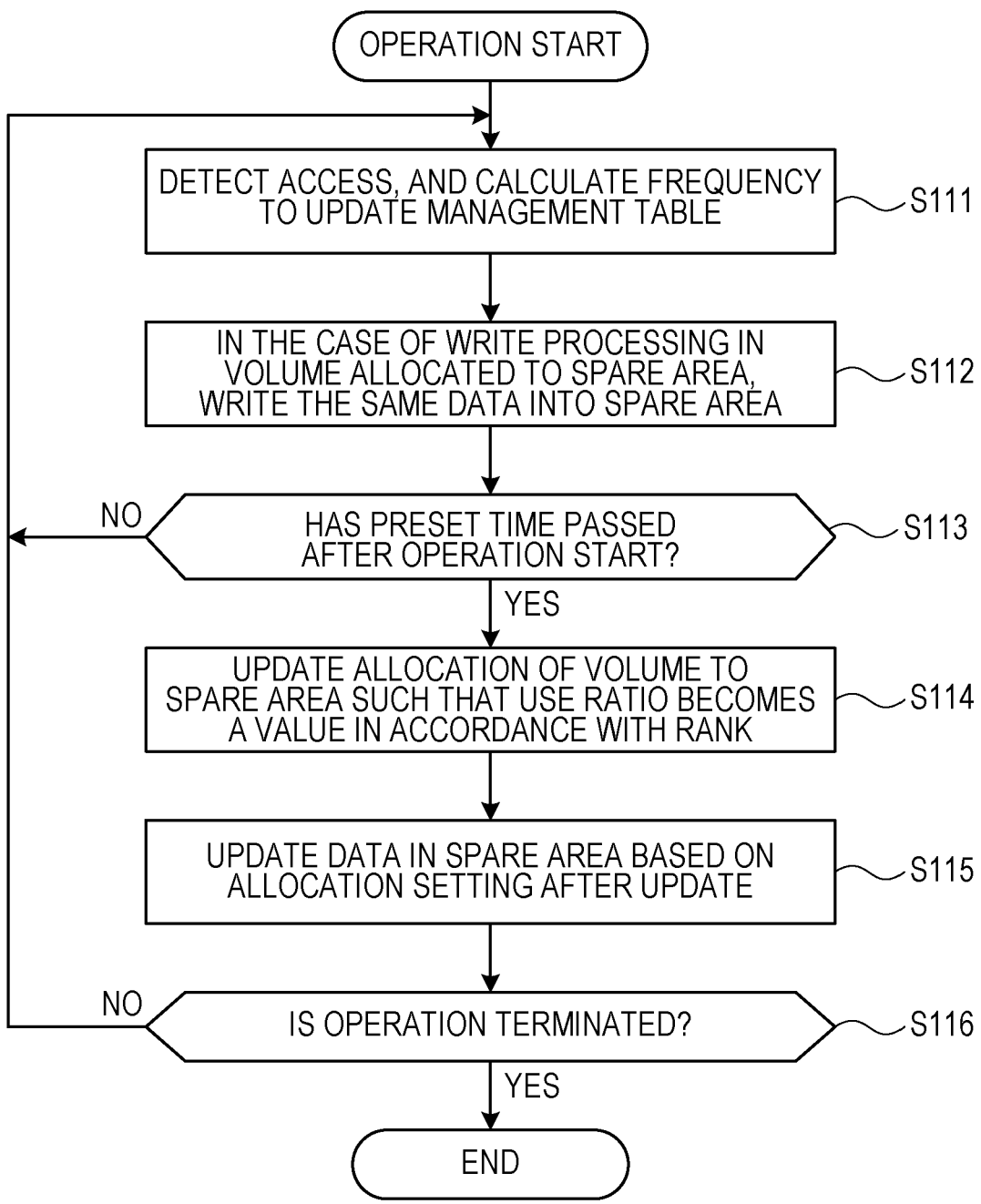
FIG. 10 is a flowchart illustrating a flow of the processing after operation start among the processing executed by the storage apparatus according to the second embodiment.

In this regard, FIG. 10 is a flowchart illustrating a processing flow after operation start among the processing executed by the storage apparatus according to the second embodiment. Also, the processing illustrated in FIG. 10 is mainly executed by the disk control unit 108. Also, for the sake of simplicity, a description will be given on the assumption of the management table generated by the processing in FIG. 9.

As illustrated in FIG. 10, the disk control unit 108 detects an access to a volume, and calculates a frequency P1 of the number of access times per unit time (S111). Also, in the processing in S111, the disk control unit 108 records the calculated frequency P1 in the management table to update the management table. For example, the disk control unit 108 measures the number of access times to the volume V1 of RAID_A, and calculates the number of access times per unit time. Then, the disk control unit 108 records the calculation result in the management table as the frequency P1.

Next, if the detected access is write processing (data write processing) to the volume allocated to the spare area, the disk control unit 108 writes the same data in the spare area (S112). For example, when the volume V1 is allocated to the spare area Sp4 (if the use ratio is not 0), if data is written into the volume V1, the disk control unit 108 writes the same data as the data written in the volume V1 to the spare area Sp4.

Next, the disk control unit 108 determines whether a preset time has passed after operation start (S113). After operation start, if the preset time has passed, the processing proceeds to S114. On the other hand, after operation start, if the preset time has not passed, the processing proceeds to S111.

If the processing proceeds to S114, the disk control unit 108 refers to the management table, and calculates the priority P4 based on the frequency P1, the factor P2, and the cardinal number P3. Further, the disk control unit 108 determines the rank R based on the priority P4 and the granularity P5. Then, the disk control unit 108 updates the allocation of the volume to the spare area so as to set the use ratio in accordance with the determined rank R (S114). In this regard, information indicating the allocation of the volume is stored in the memory 105.

Next, the disk control unit 108 updates the data in the spare area based on the allocation setting after the update (S115). For example, if the allocation of the volume V2 to the spare area Sp3 is decreased to ⅔ in capacity, and the remaining capacity is allocated to the volume V1, the disk control unit 108 reduces the data in the volume V2 to ⅔, and the data in the volume V1 is stored in the remaining capacity.

Next, the disk control unit 108 determines whether to terminate operation or not (S116). In the case of terminating operation, a series of processing illustrated in FIG. 10 is terminated. On the other hand, in the case of not terminating operation, the processing proceeds to S111.

In the above, a description has been given of the processing flow after operation start.

About Processing at the Time of Failure Occurrence

Next, a description will be given of a processing flow at the time of failure occurrence among the processing executed by the storage apparatus 100 with reference to FIG. 11.

Figure 11:
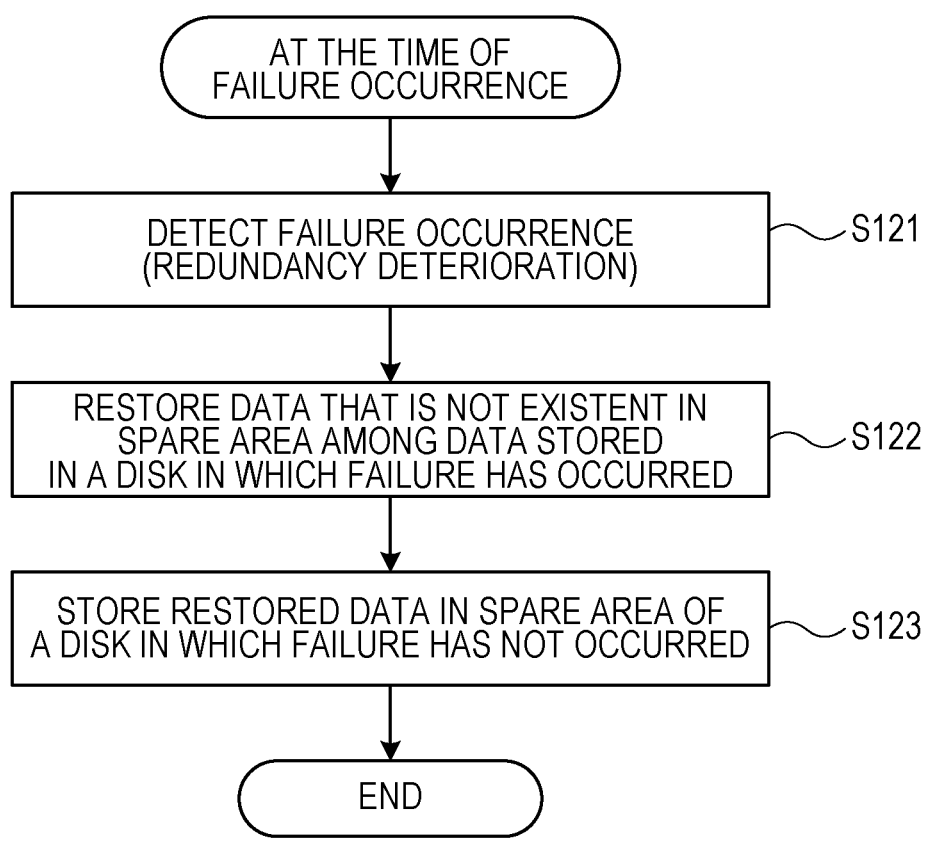
FIG. 11 is a flowchart illustrating a flow of the processing executed at the time of a failure occurrence among the processing executed by the storage apparatus according to the second embodiment.

In this regard, FIG. 11 is a flowchart illustrating the flow of the processing executed at the time of a failure occurrence among the processing executed by a storage apparatus according to the second embodiment. Also, the processing illustrated in FIG. 11 is executed mainly by the disk control unit 108.

As illustrated in FIG. 11, the disk control unit 108 detects an occurrence of a failure (S121). In this case, the amount of data redundantly stored in the plurality of disks is decreased by the occurrence of the failure, and thus the redundancy is reduced. For example, the disk control unit 108 detects a failure in one of the disks 101a, 101b, 101c, and 101d. It is possible to detect the occurrence of a failure by monitoring an error log, or the like that occurs at the time of writing data to or reading data from the disk, for example.

The disk control unit 108 that has detected a failure restores the data that is not existent in the spare area among the data stored in the disk in which a failure has occurred (S122). For example, the disk control unit 108 restores the data to be restored by parity operation using the parity data stored in a disk in which a failure has not occurred. Next, the disk control unit 108 stores the restored data into the spare area of a disk in which a failure has not occurred (S123). When the processing in S123 is completed, a series of the processing illustrated in FIG. 11 is terminated.

As described above, the data stored in the spare area does not have to be subjected to restoration processing by parity operation. Further, the spare area is used in place of the disk in which a failure has occurred so that the processing for writing the data stored in the spare area in advance into another spare area is omitted. As a result, the data stored in the spare area is restored in a short time. Also, there is a high possibility that data having a high priority is stored in the spare area, and thus it is highly possible that the data having a high priority is allowed to be restored in a short time.

In the above, a description has been given of the processing flow executed at the time of failure occurrence.

By the processing flow described above, which is executed by the storage apparatus 100, in the data restoration processing that is executed when a failure occurs in a disk, it becomes possible to increase the possibility of restoring data having a high priority in a short time. As a result, it is possible to shorten the stop time of a highly important application using the storage apparatus 100 on the whole.

2-4. Variation#1: Consideration of User Group

Next, a description will be given of a variation (variation#1) of the second embodiment with reference to FIG. 12. FIG. 12 is a diagram illustrating an example of the management table according to the variation (variation#1) of the second embodiment.

In the description so far, the frequency P1 referenced at the time of determining the use ratio of the spare area for each volume has been measured for each volume. Also, the factor P2 representing a weight for the frequency P1, and the cardinal number P3 are set for each volume. In the variation#1, a proposal will be made of a mechanism in which the frequency P1 is measured for each user, the factor P2 is measured for each user, and the cardinal number P3 is set for each group to which a user belongs.

For example, in the case of using the functions of Active Directory (AD), or the like, it is possible to set conditions in accordance with a user or a group using a user name (user ID) identifying a user, a group name (group ID) identifying a group, and the like. Also, if the terminal apparatuses 51a, 51b, and 51c are connected with the storage apparatus 100 using Common Internet File System (CIFS), information on a user or a group is obtained at the time of accessing. In a system having such a function, it is possible to perform operation based on the variation#1.

In the case of applying variation#1, the management table is changed as illustrated in FIG. 12. In the example in FIG. 12, the frequency P1 is measured for each user, and the measured frequency P1 is recorded in the management table in association with an individual user name U. Also, the factor P2 is set for each user, and the set factor P2 is recorded in the management table in accordance with an individual user name U. However, it is possible to change the factor P2 to be set for each group.

Also, the cardinal number P3 is set for each group to which a user belongs, and is recorded in the management table in association with an individual group name G. However, it is possible to change to set the cardinal number P3 for each user. Also, the priority P4 is calculated for each volume, and is recorded in the management table in association with an individual volume name. Also, the granularity P5 is set for each RAID apparatus, and is recorded in the management table in association with an individual RAID name. Then, the rank R is determined for each volume.

Method of Calculating Priority P4, and Method of Determining Rank R

The priority P4 is the sum of the priority calculated for each user. For example, the disk control unit 108 measures the frequency P1 for a user User1 belonging the group Group1 on the volume V1, and calculates the priority of the user User1 using the measured frequency P1, and the factor P2 and the cardinal number P3 set in the management table. In the example in FIG. 12, the priority of the user User1 becomes 4000 (=3000×1+1000).

Also, the disk control unit 108 measures the frequency P1 for the user User2 belonging the group Group1, and calculates the priority of the user User2 using the measured frequency P1, and the factor P2 and the cardinal number P3 set in the management table. In the example in FIG. 12, the priority of the user User2 becomes 2000 (=500×2+1000).

Also, the disk control unit 108 measures the frequency P1 for the user User3 belonging the group Group1, and calculates the priority of the user User3 using the measured frequency P1, and the factor P2 and the cardinal number P3 set in the management table. In the example in FIG. 12, the priority of the user User3 becomes 3500 (=500×3+2000). Then, the disk control unit 108 adds up the calculated priorities of the users User1, User2, and User3, and records the total value (9500) in the management table as the priority P4 of the volume V1.

In the same manner, the disk control unit 108 calculates the priority P4 of the volume V2. In the example in FIG. 12, the priority P4 of the volume V2 becomes 5670. When the priorities P4 of the volumes V1 and V2 are obtained, the disk control unit 108 determines the ranks R of the volumes V1 and V2 based on the priority P4 and the granularity P5. In the example in FIG. 12, the rank R of the volume V1 is determined to be 2, and the rank R of the volume V2 is determined to be 2. When the rank R is determined, the ratio of the spare area is determined based on the determined rank R.

In the above, a description has been given of a variation (variation#1) of the second embodiment.

2-5. Variation#2: Consideration of No-Access Time

Next, a description will be given of a variation (variation#2) of the second embodiment with reference to FIG. 13 and FIG. 14. FIG. 13 is a diagram illustrating an example of a management table according to a variation (variation#2) of the second embodiment. FIG. 14 is a diagram illustrating an example of disk management information according to a variation (variation#2) of the second embodiment.

In the description so far, the description has been given on the premise that operation is performed by setting the factor P2 and the cardinal number P3 to preset values. In the variation#2, a proposal is made of a mechanism of adjusting the factor P2 and the cardinal number P3 in accordance with a state of continuing no access, and an error occurrence state. For example, the disk control unit 108 decreases the cardinal number of a volume in a state of continuous no accesses, and increases the factor and the cardinal number of a volume belonging to a disk having a high error occurrence frequency.

As illustrated in FIG. 13, a management table according to the variation#2 further has items on a no-access continuous time T, a time unit t, and a decrease width W. The no-access continuous time T represents the length of continuous time having no access to a volume. Also, the no-access continuous time T is measured by the disk control unit 108 for each volume, and is recorded in the management table in association with a volume name.

The time unit t is a unit of time used at the time of evaluating the no-access continuous time T. Also, the time unit t is set in advance, and is recorded in the management table. The decrease width W is a unit of the amount of decrease of the cardinal number P3. The decrease width W is set in advance, and is recorded in the management table. The disk control unit 108 multiplies the no-access continuous time T divided by the time unit t, and the decrease width W, and decreases the cardinal number P3 by the value obtained by the multiplication. That is to say, the priority P4 is given by "P1×P2+(P3−W×(T/t))".

In the example in FIG. 13, the priority P4 of the volume V1 becomes 0 (=0×1+(1000−500×(20/10))). In the same manner, the priority P4 of the volume V2 becomes 1500 (=500×1+(1000−100×(0/10))).

When the priority P4 of the volumes V1 and V2 are obtained, the disk control unit 108 determines the ranks R of the volumes V1 and V2 based on the priority P4 and the granularity P5. In the example in FIG. 13, the rank R of the volume V1 is determined to be 0, and the rank R of the volume V2 is determined to be 1. However, if the priority P4 is 0, the rank R is determined to be 0. When the rank R is determined, the ratio of the spare area is set based on the determined rank R. In this regard, in the case of this example, the volume V1 is not allocated to the spare area.

As described above, if the management table exemplified in FIG. 13 is used, it is possible to decrease the cardinal number of the volume having no access state continuing for a certain period of time.

Also, at least one of the factor P2 and the cardinal number P3 may be increased in consideration of a statistical value of the errors that have occurred for each disk. For example, the disk control unit 108 monitors an error log that has occurred at the time of access to the disks 101a, 101b, 101c, and 101d, and calculates the total number of errors E that occurred in the past for each disk. Also, the disk control unit 108 stores the calculated total number of errors E in the memory as disk management information (refer to FIG. 14).

As illustrated in FIG. 14, the disk management information includes a total number of errors E, an evaluation unit e, an increase unit [%], an increase rate r, and a belonging volume name. The evaluation unit e, and the increase unit are values that are set by a user or an administrator in advance. The disk control unit 108 multiplies the total number of errors E divided by the evaluation unit e, and the increase unit to determine the increase rate r. In the example in FIG. 14, the evaluation value of the disk name DISK_A is 2 (=100/50), and thus the increase rate r becomes 20%.

When the disk control unit 108 calculates the priority based on the management table, the disk control unit 108 adjusts the factor P2, and the cardinal number P3 contained in the management table based on the increase rate r included in the disk management information. For example, if the volume V1 belongs to DISK_A, and DISK_B, the disk control unit 108 calculates the average value (18%) of the increase rate r (20%) of DISK_A, and the increase rate r (16%) of DISK_B. Then, the disk control unit 108 increases the factor P2 and the cardinal number P3 of the volume V1 by the calculated average value (18%) of the increase rate r.

As described above, the use of the disk management information illustrated in FIG. 14 increases the factor P2 and the cardinal number P3 in accordance with the error occurrence state of a disk, and thus the setting is made such that the higher a failure occurrence probability of a disk of a volume, the higher the use ratio of the spare area. In this regard, in the above-described example, the method of using the increase rate r is described. However, it is possible to use a mechanism of calculating the increase width in place of the rate, and to increase the factor P2, and the cardinal number P3. Also, it is possible to employ a mechanism of increasing either the factor P2 or the cardinal number P3. Such a variation is also included in the technical scope of the second embodiment.

In the above, a description has been given of a variation (variation#2) of the second embodiment.

In the above, a description has been given of the second embodiment.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage apparatus comprising:
a plurality of storage devices individually including a first storage area storing data, and a second storage area storing same data as part of the data stored in the first storage area, and configured to distributedly store a plurality of data belonging to a same management unit among a plurality of management units;
a memory, and
a processor coupled to the memory and configured to execute a process comprising;

setting a use ratio for each of the management units on the second storage areas included in the plurality of storage devices based on a priority set for each of the management units, wherein the management unit is a unit volume set in the plurality of storage devices, the priority is set based on an update frequency of data measured for each of the management units, and the priority is set based on the update frequency of data by an individual user assigned to the unit volume.

2. The storage apparatus according to claim 1,
wherein, in the setting, a higher use ratio is set as the priority is higher.

3. The storage apparatus according to claim 1,
wherein the priority is set to a value produced by weighting the update frequency using a weight value set for each of the management units.

4. The storage apparatus according to claim 1, wherein the priority is set to a value produced by weighting the update frequency using a first weight value set for the individual user, and a second weight value set for each group including the user.

5. The storage apparatus according to claim 1,
wherein the process further comprising;
measuring a length of time having no data update for each of the management units, and decreasing the priority in accordance with a result of the measurement.

6. The storage apparatus according to claim 1,
wherein when the process further comprising;
storing data belonging to the management unit having the use ratio set in the second storage area into the first storage area and also storing the data into the second storage area, and
executing a restoration processing, when the data in the first storage area included in the storage device having experienced a failure occurrence, using restoration target data stored in the second storage area included in the storage device having not experienced a failure occurrence.

7. The storage apparatus according to claim 1,
wherein, in the setting, when setting a use ratio of the second storage area held by one of the storage devices for each of the management units, setting the use ratio based on the priority for the management unit other than the management unit to which data stored in the one of the storage devices belongs.

8. The storage apparatus according to claim 1,
wherein the memory stores a management table associating the storage device, the management unit, the priority, and the use ratio with one another, and
wherein, in the setting, the management table is referred to for setting a use ratio for each of the management units.

9. A method of controlling a storage apparatus including a plurality of storage devices individually including a first storage area storing data, and a second storage area storing same data as part of the data stored in the first storage area, and configured to distributedly store a plurality of data belonging to a same management unit among a plurality of management units, the method comprising:

setting a use ratio for each of the management units on the second storage areas included in the plurality of storage devices based on a priority set for each of the management units, wherein the management unit is a unit volume set in the plurality of storage devices, the priority is set based on an update frequency of data measured for each of the management units, and the priority is set based on an update frequency of data by an individual user assigned to the unit volume.

10. The method of controlling a storage apparatus, according to claim 9,
wherein a higher use ratio is set as the priority is higher.

11. The method of controlling a storage apparatus, according to claim 9,
wherein the priority is set to a value produced by weighting the update frequency using a weight value set for each of the management units.

12. The method of controlling a storage apparatus, according to claim 9, wherein the priority is set to a value produced by weighting the update frequency using a first weight value set for the individual user, and a second weight value set for each group including the user.

13. The method of controlling a storage apparatus, according to claim 9,
wherein a length of time having no data update is measured for each of the management units, and the priority is decreased in accordance with a result of the measurement.

14. The method of controlling a storage apparatus, according to claim 9,
wherein when data belonging to the management unit having the use ratio set in the second storage area is stored in the first storage area, the data is stored into the second storage area, and
when data in the first storage area included in the storage device having experienced a failure occurrence is restored, restoration processing is executed using restoration target data stored in the second storage area included in the storage device having not experienced a failure occurrence.

15. A storage controller for managing a storage apparatus including a plurality of storage devices individually including a first storage area storing data, and a second storage area storing same data as part of the data stored in the first storage area, and configured to distributedly store a plurality of data included in a same management unit among a plurality of management units, the storage controller comprising:

a memory, and a processor coupled to the memory and configured to execute a process comprising;

setting a use ratio for each of the management units on the second storage areas included in the plurality of storage devices based on a priority set for each of the management units, wherein the management unit is a unit volume set in the plurality of storage devices, the priority is set based on an update frequency of data measured for each of the management units, and the priority is set based on an update frequency of data by an individual user assigned to the unit volume.

* * * * *